US008737421B2

(12) United States Patent
Zhang et al.

(10) Patent No.: US 8,737,421 B2
(45) Date of Patent: May 27, 2014

(54) MAC PACKET DATA UNIT CONSTRUCTION FOR WIRELESS SYSTEMS

(75) Inventors: Hang Zhang, Nepean (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 12/874,829

(22) Filed: Sep. 2, 2010

(65) Prior Publication Data
US 2011/0080873 A1 Apr. 7, 2011

Related U.S. Application Data

(63) Continuation-in-part of application No. 13/068,841, filed on Sep. 2, 2009.

(60) Provisional application No. 61/239,134, filed on Sep. 2, 2009, provisional application No. 61/094,148, filed on Sep. 4, 2008.

(51) Int. Cl.
*H04J 3/16* (2006.01)

(52) U.S. Cl.
USPC ............ 370/437; 370/242; 370/328; 370/471

(58) Field of Classification Search
USPC ......... 370/203, 204, 206, 208, 210, 242, 246, 370/328, 331, 437, 471
See application file for complete search history.

(56) References Cited

U.S. PATENT DOCUMENTS

| 7,430,182 B2 * | 9/2008 | Kwon et al. | 370/310 |
| 2005/0201378 A1 | 9/2005 | Ludwig et al. | |
| 2006/0156162 A1 * | 7/2006 | Choi et al. | 714/748 |
| 2008/0031254 A1 | 2/2008 | Veerapuneni | |
| 2009/0092076 A1 | 4/2009 | Zheng et al. | |
| 2009/0116436 A1 | 5/2009 | Okuda | |
| 2009/0141670 A1 * | 6/2009 | Duncan Ho | 370/328 |
| 2009/0310533 A1 * | 12/2009 | Zheng et al. | 370/328 |

(Continued)

FOREIGN PATENT DOCUMENTS

| WO | 2008/150088 | 12/2008 |
| WO | 2009/032436 | 3/2009 |
| WO | 2009/075529 | 6/2009 |
| WO | PCT/CA2010/001374 | 1/2011 |

OTHER PUBLICATIONS

U.S. Appl. No. 60/976,764, filed Oct. 1, 2007; Ho, Sai.*
Zhang, Hang et al., "Proposal for IEEE 802.16M MAC Header and Subheader", IEEE C802.16m-08/1059, Sep. 5, 2009, 13 pages.
Office Action including Notice of References Cited for corresponding U.S. Appl. No. 13/068,841, Mar. 2, 2012, 8 pages.

*Primary Examiner* — Benjamin H Elliott, IV
(74) *Attorney, Agent, or Firm* — Womble Carlyle Sandridge & Rice LLP

(57) ABSTRACT

A method for wireless communication using MAC PDUs. The method includes determining one or more characteristics of a service flow and selecting on the basis of the one or more characteristics a MAC PDU header type among a plurality of MAC PDU header types. The service flow data is encapsulated in MAC PDUs with a header of the selected type. The MAC PDUs with the encapsulated service flow data are then wirelessly transmitted. Also, a method for communication between a Base Station (BS) and a Subscriber Station (SS). The method includes generating at the BS a plurality of MAC PDU packets with a payload component holding service flow data and a plurality of MAC PDU packets without payload component, carrying control information. The method also includes transmitting wirelessly the MAC PDU packets with the payload component and the MAC PDU packets with the control information to the SS.

45 Claims, 15 Drawing Sheets

(56) References Cited

U.S. PATENT DOCUMENTS

2010/0118889 A1* 5/2010 Chun et al. .................... 370/469
2010/0135495 A1* 6/2010 Chion et al. .................. 380/273
2011/0080873 A1* 4/2011 Zhang et al. .................. 370/328
2011/0110305 A1 5/2011 Wang et al.
2012/0026924 A1* 2/2012 Zhang et al. .................. 370/310
2013/0028155 A1 1/2013 Zang et al.
2013/0034075 A1 2/2013 Zang et al.

* cited by examiner

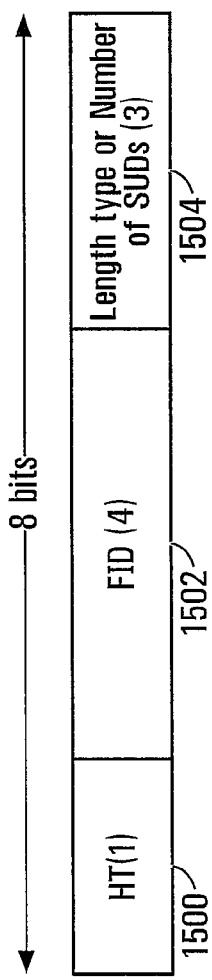
FIG. 15
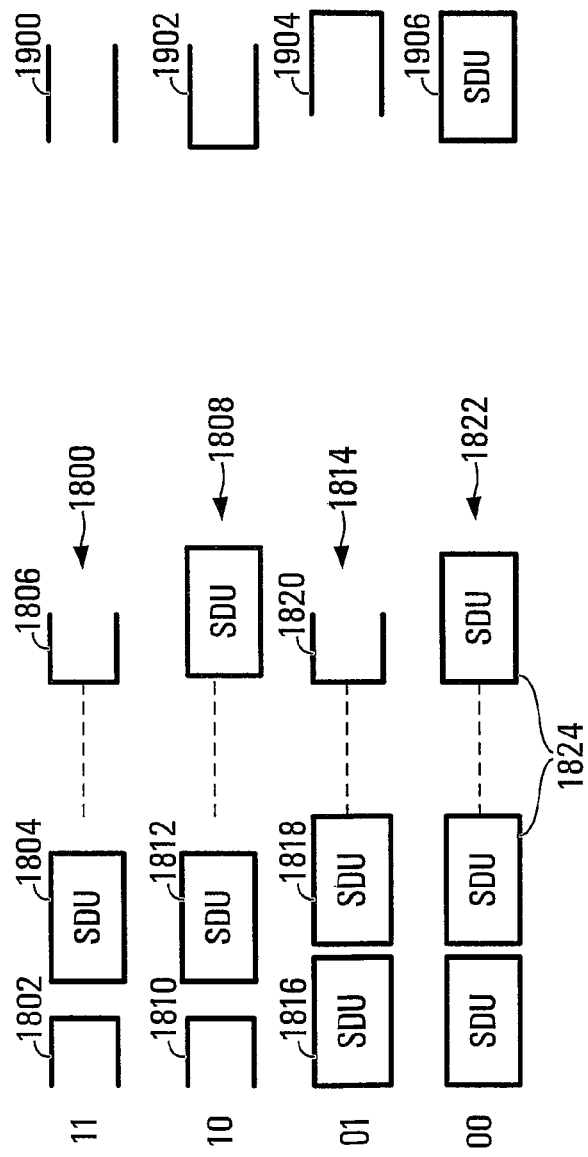
FIG. 16
FIG. 17

MAC PACKET DATA UNIT CONSTRUCTION FOR WIRELESS SYSTEMS

CROSS-REFERENCE TO RELATED APPLICATIONS

This application is a continuation-in-part of the non-provisional application Ser. No. 13/068,841 filed Sep. 2, 2009 resulting from conversion under 37 C.F.R. §1.53(c)(3) of U.S. provisional patent application No. 61/239,134 filed on Sep. 2, 2009, and which claims the benefit of U.S. provisional patent application No. 61/094,148 filed on Sep. 4, 2008.

FIELD OF THE INVENTION

This application relates to wireless communication techniques in general, and more specifically to the structure of a MAC packet data unit.

BACKGROUND

The demand for services in which data is delivered via a wireless connection has grown in recent years and is expected to continue to grow. Included are applications in which data is delivered via cellular mobile telephony or other mobile telephony, personal communications systems (PCS) and digital or high definition television (HDTV). Though the demand for these services is growing, the channel bandwidth over which the data may be delivered is limited. Therefore, it is desirable to deliver data at high speeds over this limited bandwidth in an efficient, as well as cost effective, manner.

One possible approach for delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as sub-carrier frequencies ("sub-carriers"). The frequency spectra of the sub-carriers overlap so that the spacing between them is minimized. The sub-carriers are also orthogonal to each other so that they are statistically independent and do not create crosstalk or otherwise interfere with each other. As a result, the channel bandwidth is used much more efficiently than in conventional single carrier transmission schemes such as AM/FM (amplitude or frequency modulation).

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such that there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

In wireless communication systems, such as those that function under the new standard IEEE802.16m send and receive information that is organized into MAC packets. However, currently used MAC packet structures are less than optimal.

Accordingly, there is a need for an improved MAC packet structures for use mobile wireless systems.

SUMMARY

In accordance with a first broad aspect is provided a method for wireless communication using MAC PDUs. The method includes determining one or more characteristics of a service flow and selecting on the basis of the one or more characteristics a MAC PDU header type among a plurality of MAC PDU header types. The service flow data is encapsulated in MAC PDUs with a header of the selected type. The MAC PDUs with the encapsulated service flow data are then wirelessly transmitted.

In accordance with a second broad aspect is provided a method for wireless communication using MAC PDUs. The method includes determining if a desired service flow is a VoIP service flow or a service flow that is not a VoIP service flow and selecting on the basis of the determining a MAC PDU header type among a plurality of MAC PDU header types. The service flow data is encapsulated in MAC PDUs with a header of the selected type. The MAC PDUs with the encapsulated service flow data are then wirelessly transmitted.

In accordance with a third broad aspect is provided a device for performing wireless communication using MAC PDUs. The device has a logic including software for execution by a CPU for determining one or more characteristics of a service flow and for selecting on the basis of the one or more characteristics a MAC PDU header type among a plurality of MAC PDU header types. The device encapsulates the service flow data in MAC PDUs with the selected MAC PDU header type and wirelessly transmits it.

In accordance with a third broad aspect is provided a method for wireless communication using MAC PDUs. The method includes providing control information conveying a parameter of a wireless communication system, encapsulating the control information in a MAC PDU packet and transmitting wirelessly the MAC PDU packet.

In accordance with a fourth broad aspect is provided a method for communication between a Base Station (BS) and a Subscriber Station (SS). The method includes generating at the BS a plurality of MAC PDU packets with a payload component holding service flow data and a plurality of MAC PDU packets without payload component, carrying control information. The method also includes transmitting wirelessly the MAC PDU packets with the payload component and the MAC PDU packets with the control information to the SS.

In accordance with a fifth broad aspect is provided a method for wireless communication between a first station and a second station. The method includes performing a ranging code transmission between the first and the second station and sending on an uplink between the first and the second station MAC PDU packets without payload component, each MAC PDU packet having a header conveying control information.

Aspects and features of the present application will become apparent to those ordinarily skilled in the art upon review of the following description of specific embodiments of a disclosure in conjunction with the accompanying drawing figures and appendices.

BRIEF DESCRIPTION OF THE DRAWINGS

Embodiments of the present application will now be described, by way of example only, with reference to the accompanying drawing figures, wherein:

FIG. 15 illustrates the header structure of a MAC PDU according to an example of implementation of the invention;

FIG. 16 illustrate a series of SDU fragmentation schemes for use in a MAC PDU according to example of implementation of the invention where the MAC PDU carries a plurality of SDUs;

FIG. 17 illustrates a series of SDU fragmentation schemes for use in a MAC PDU according to example of implementation of the invention where the MAC PDU carries an SDU fragment only or a single complete SDU;

Like reference numerals are used in different figures to denote similar elements.

DETAILED DESCRIPTION

Figure 1:
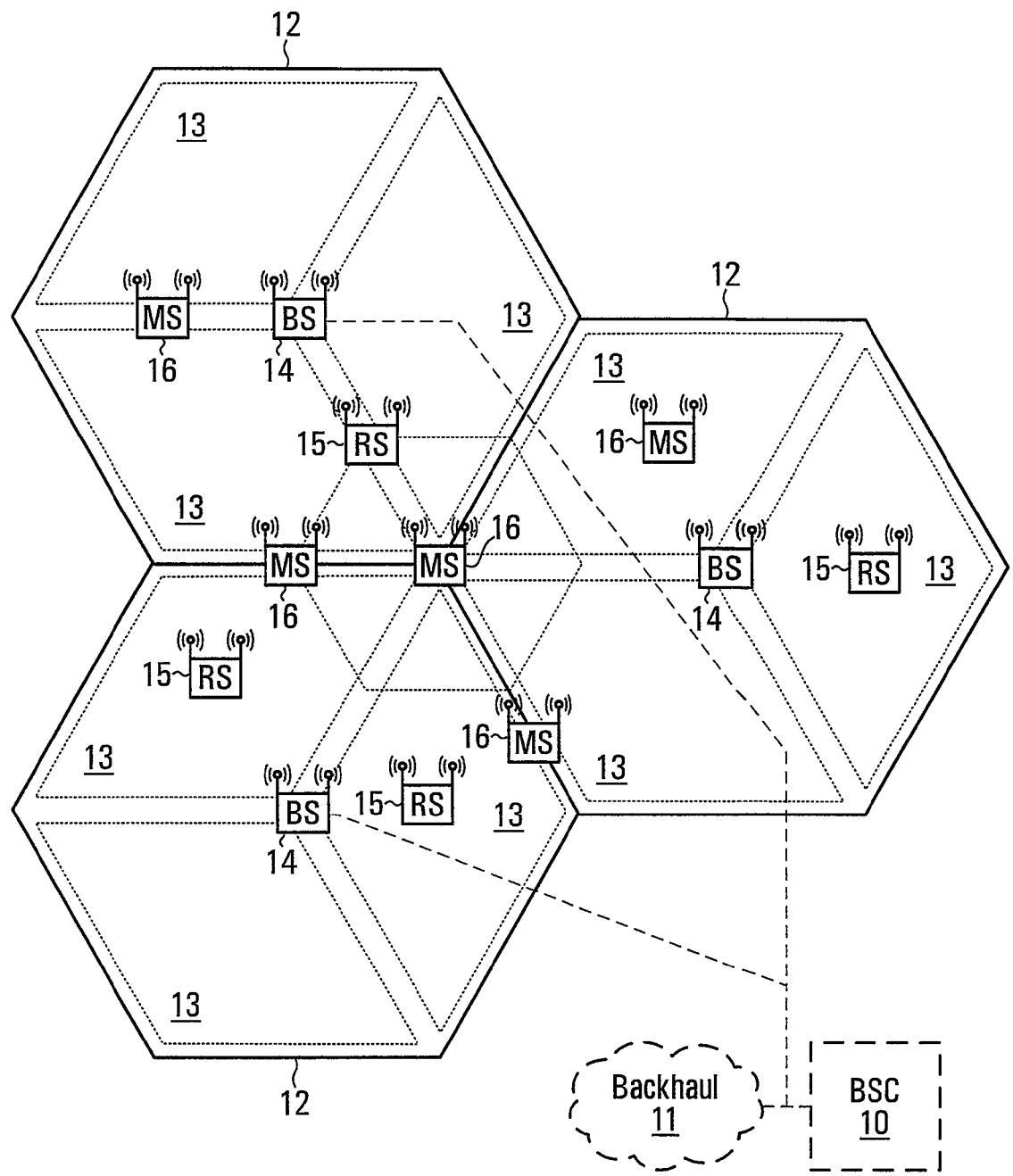
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each BS 14 facilitates communications using OFDM with subscriber stations, (SS) 16 which can be any entity capable of communicating with the base station, and may include mobile and/or wireless terminals or fixed terminals, which are within the cell 12 associated with the corresponding BS 14. If SSs 16 moves in relation to the BSs 14, this movement results in significant fluctuation in channel conditions. As illustrated, the BSs 14 and SSs 16 may include multiple antennas to provide spatial diversity for communications. In some configurations, relay stations 15 may assist in communications between BSs 14 and wireless terminals 16. SS 16 can be handed off 18 from any cell 12, sector 13, zone (not shown), BS 14 or relay 15 to another cell 12, sector 13, zone (not shown), BS 14 or relay 15. In some configurations, BSs 14 communicate with each and with another network (such as a core network or the internet, both not shown) over a backhaul network 11. In some configurations, a base station controller 10 is not needed.

Figure 2:
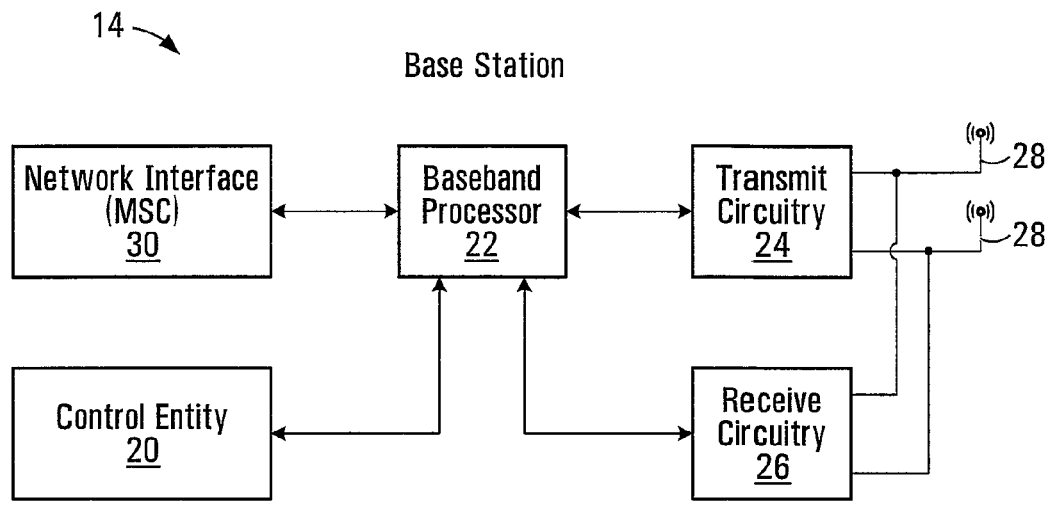
FIG. 2 is a block diagram of an example base station that might be used to implement some embodiments of the present application.

With reference to FIG. 2, an example of a BS 14 is illustrated. The BS 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by SSs 16 (illustrated in FIG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another SS 16 serviced by the BS 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

Figure 3:
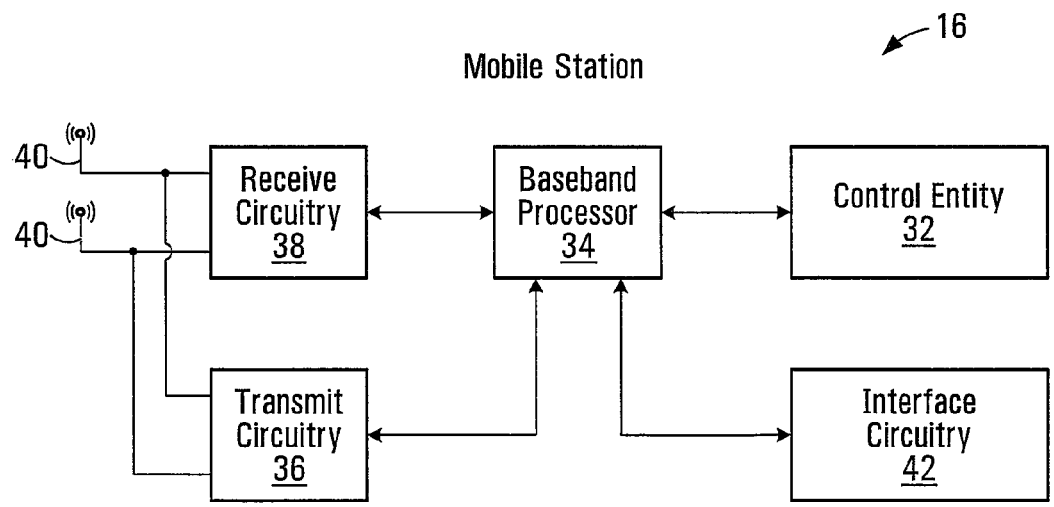
FIG. 3 is a block diagram of an example wireless terminal that might be used to implement some embodiments of the present application.

With reference to FIG. 3, an example of a subscriber station (SS) 16 is illustrated. SS 16 can be, for example a mobile station. Similarly to the BS 14, the SS 16 will include a control system 32, a baseband processor 34, transmit circuitry 36, receive circuitry 38, multiple antennas 40, and user interface circuitry 42. The receive circuitry 38 receives radio frequency signals bearing information from one or more BSs 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs). For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the SS and the base station, either directly or via the relay station.

In OFDM modulation, the transmission band is divided into multiple, orthogonal subcarriers. Each subcarrier is modulated according to the digital data to be transmitted. Because OFDM divides the transmission band into multiple subcarriers, the bandwidth per carrier decreases and the modulation time per carrier increases. Since the multiple subcarriers are transmitted in parallel, the transmission rate for the digital data, or symbols (discussed later), on any given subcarrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal subcarriers are generated for multiple bands within a transmission channel. The modulated signals are digital signals having a relatively low transmission rate and capable of staying within their respective bands. The individual subcarriers are not modulated directly by the digital signals. Instead, all subcarriers are modulated at once by IFFT processing.

In operation, OFDM is preferably used for at least the downlink transmission from the BSs 14 to the SSs 16. Each BS 14 is equipped with "n" transmit antennas 28 (n>=1), and each SS 16 is equipped with "m" receive antennas 40 (m>=1). Notably, the respective antennas can be used for reception and transmission using appropriate duplexers or switches and are so labeled only for clarity.

When relay stations 15 are used, OFDM is preferably used for downlink transmission from the BSs 14 to the relays 15 and from relay stations 15 to the SSs 16.

Figure 4:
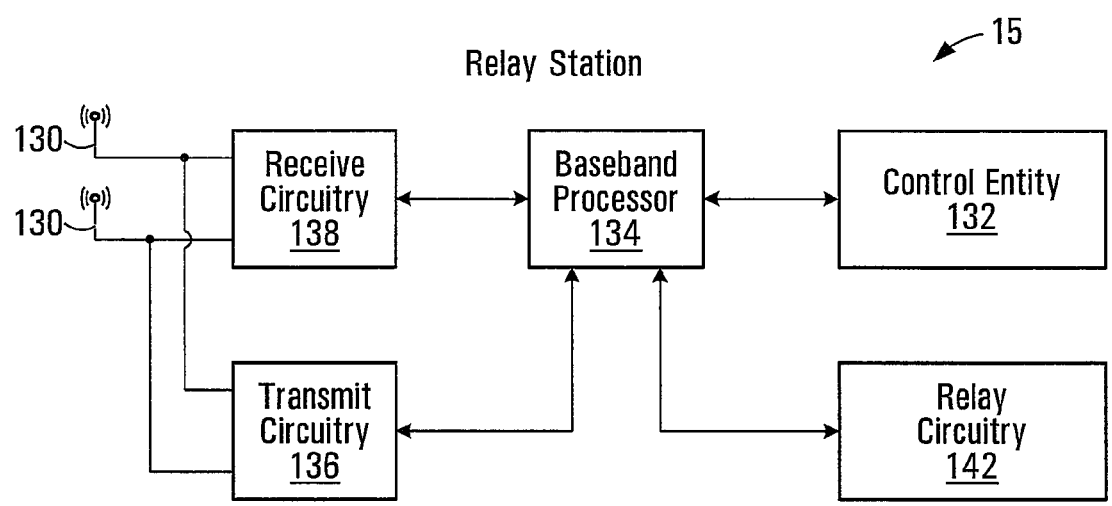
FIG. 4 is a block diagram of an example relay station that might be used to implement some embodiments of the present application.

With reference to FIG. 4, an example of a relay station 15 is illustrated. Similarly to the BS 14, and the SS 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and SSs 16. The receive circuitry 138 receives radio frequency signals bearing information from one or more BSs 14 and SSs 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the SS and the base station, either directly or indirectly via a relay station, as described above.

Figure 5:
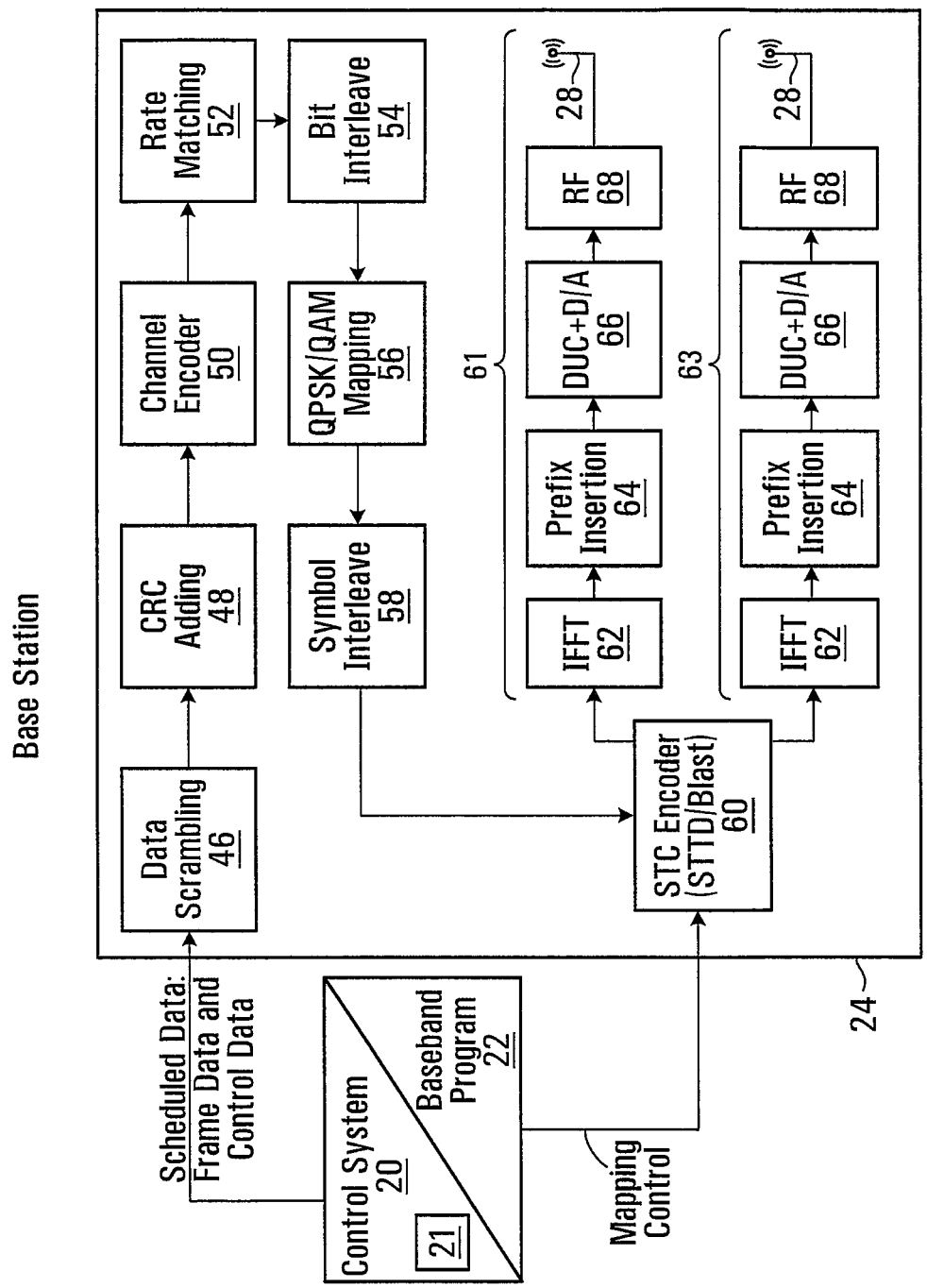
FIG. 5 is a block diagram of a logical breakdown of an example OFDM transmitter architecture that might be used to implement some embodiments of the present application.

With reference to FIG. 5, a logical OFDM transmission architecture will be described. Initially, the base station controller 10 will send data to be transmitted to various SSs 16 to the BS 14, either directly or with the assistance of a relay station 15. The BS 14 may use the information on the quality of channel associated with the SSs to schedule the data for transmission as well as select appropriate coding and modulation for transmitting the scheduled data. The quality of the channel is found using control signals, as described in more details below. Generally speaking, however, the quality of channel for each SS 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data may be determined and appended to the scrambled data using CRC adding logic 48. Next, channel coding is performed using channel encoder logic 50 to effectively add redundancy to the data to facilitate recovery and error correction at the SS 16. Again, the channel coding for a particular SS 16 may be based on the quality of channel. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the modulation scheme chosen by mapping logic 56. The modulation scheme may be, for example, Quadrature Amplitude Modulation (QAM), Quadrature Phase Shift Key (QPSK) or Differential Phase Shift Keying (DPSK) modulation. For transmission data, the degree of modulation may be chosen based on the quality of channel for the particular SS. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC)

encoder logic 60, which modifies the symbols in a fashion making the transmitted signals more resistant to interference and more readily decoded at a SS 16. The STC encoder logic 60 will process the incoming symbols and provide "n" outputs corresponding to the number of transmit antennas 28 for the BS 14. The control system 20 and/or baseband processor 22 as described above with respect to FIG. 5, will provide a mapping control signal to control STC encoding. At this point, assume the symbols for the "n" outputs are representative of the data to be transmitted and capable of being recovered by the SS 16.

For the present example, assume the BS 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended SS 16 are scattered among the sub-carriers. The SS 16 may use the pilot signals for channel estimation.

Figure 6:
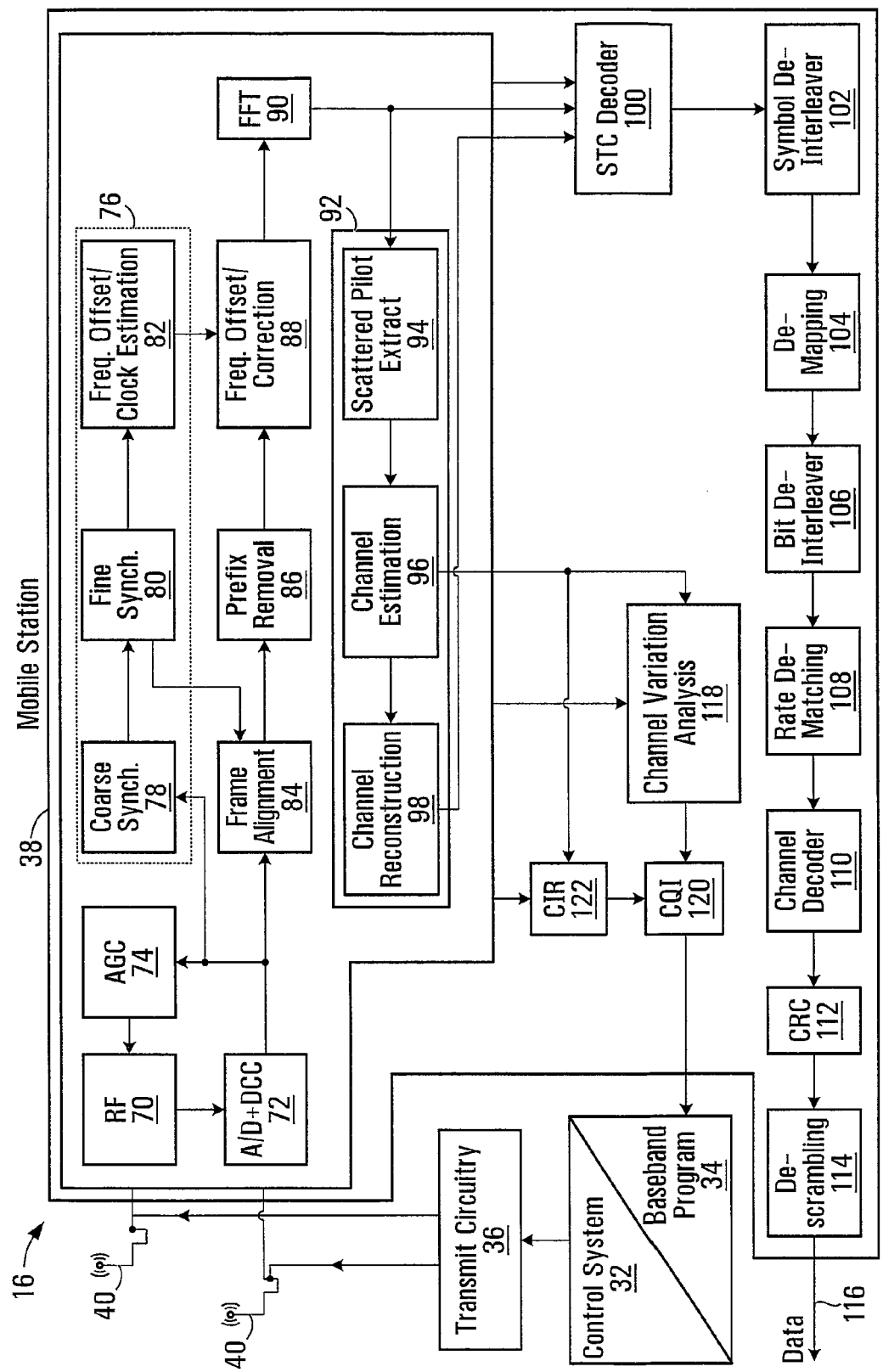
FIG. 6 is a block diagram of a logical breakdown of an example OFDM receiver architecture that might be used to implement some embodiments of the present application.

Reference is now made to FIG. 6 to illustrate reception of the transmitted signals by a SS 16, either directly from BS 14 or with the assistance of relay 15. Upon arrival of the transmitted signals at each of the antennas 40 of the SS 16, the respective signals are demodulated and amplified by corresponding RF circuitry 70. For the sake of conciseness and clarity, only one of the two received paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level. Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bit stream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum; checks the scrambled data in traditional fashion, and provides it to the de-scrambling logic 114 for descrambling using the known base station de-scrambling code to recover the originally transmitted data 116.

In parallel to recovering the data 116, a CQI signal comprising an indication of channel quality, or at least information sufficient to derive some knowledge of channel quality at the BS 14, is determined and transmitted to the BS 14 transmission of the CQI signal will be described in more detail below. As noted above, the CQI may be a function of the carrier-to-interference ratio (CR), as well as the degree to which the channel response varies across the various sub-carriers in the OFDM frequency band. For example, the channel gain for each sub-carrier in the OFDM frequency band being used to transmit information may be compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data. In some embodiments, a relay station may operate in a time division manner using only one radio, or alternatively include multiple radios.

FIGS. 1 to 6 provide one specific example of a communication system that could be used to implement embodiments of the application. It is to be understood that embodiments of the application can be implemented with communications systems having architectures that are different than the specific example, but that operate in a manner consistent with the implementation of the embodiments as described herein.

Figure 7:
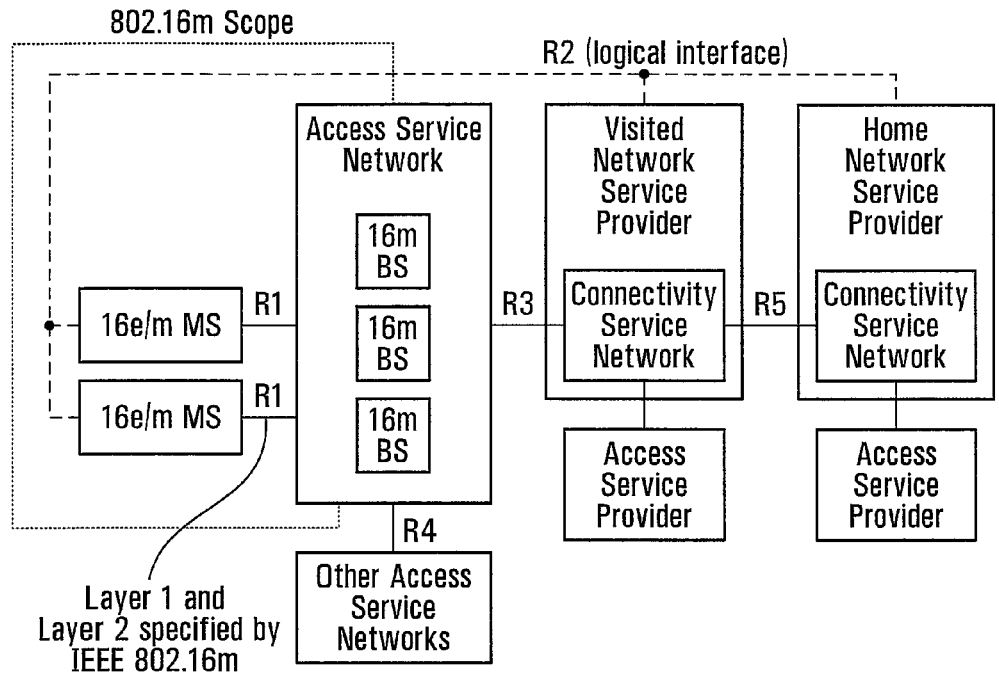
FIG. 7 is FIG. 1 of IEEE 802.16m-08/003rl, an Example of overall network architecture.

Turning now to FIG. 7, there is shown an example network reference model, which is a logical representation of a network that supports wireless communications among the aforementioned BSs 14, SSs 16 and relay stations (RSs) 15, in accordance with a non-limiting embodiment of the present invention. The network reference model identifies functional entities and reference points over which interoperability is achieved between these functional entities. Specifically, the network reference model can include an SS 16, an Access Service Network (ASN), and a Connectivity Service Network (CSN).

The ASN can be defined as a complete set of network functions needed to provide radio access to a subscriber (e.g., an IEEE 802.16e/m subscriber). The ASN can comprise network elements such as one or more BSs 14, and one or more ASN gateways. An ASN may be shared by more than one CSN. The ASN can provide the following functions:
  Layer-1 and Layer-2 connectivity with the SS 16;
  Transfer of AAA messages to subscriber's Home Network Service Provider (H-NSP) for authentication, authorization and session accounting for subscriber sessions
  Network discovery and selection of the subscriber's preferred NSP;
  Relay functionality for establishing Layer-3 (L3) connectivity with the SS 16 (e.g., IP address allocation);
  Radio resource management.

In addition to the above functions, for a portable and mobile environment, an ASN can further support the following functions:
  ASN anchored mobility;
  CSN anchored mobility;
  Paging;
  ASN-CSN tunnelling.

For its part, the CSN can be defined as a set of network functions that provide IP connectivity services to the subscriber. A CSN may provide the following functions:
  MS IP address and endpoint parameter allocation for user sessions;
  AAA proxy or server;
  Policy and Admission Control based on user subscription profiles;
  ASN-CSN tunnelling support;
  Subscriber billing and inter-operator settlement;
  Inter-CSN tunnelling for roaming;
  Inter-ASN mobility.

The CSN can provide services such as location based services, connectivity for peer-to-peer services, provisioning, authorization and/or connectivity to IP multimedia services. The CSN may further comprise network elements such as routers, AAA proxy/servers, user databases, and interworking gateway MSs. In the context of IEEE 802.16m, the CSN may be deployed as part of a IEEE 802.16m NSP or as part of an incumbent IEEE 802.16e NSP.

Figure 8:
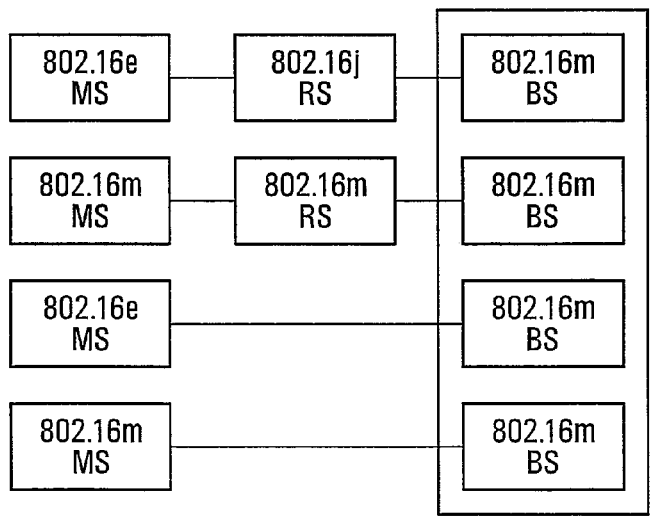
FIG. 8 is FIG. 2 of IEEE 802.16m-08/003rl, a Relay Station in overall network architecture.

In addition, RSs 15 may be deployed to provide improved coverage and/or capacity. With reference to FIG. 8, a BS 14 that is capable of supporting a legacy RS communicates with the legacy RS in the "legacy zone". The BS 14 is not required to provide legacy protocol support in the "16m zone". The relay protocol design could be based on the design of IEEE 802-16j, although it may be different from IEEE 802-16j protocols used in the "legacy zone".

Figure 9:
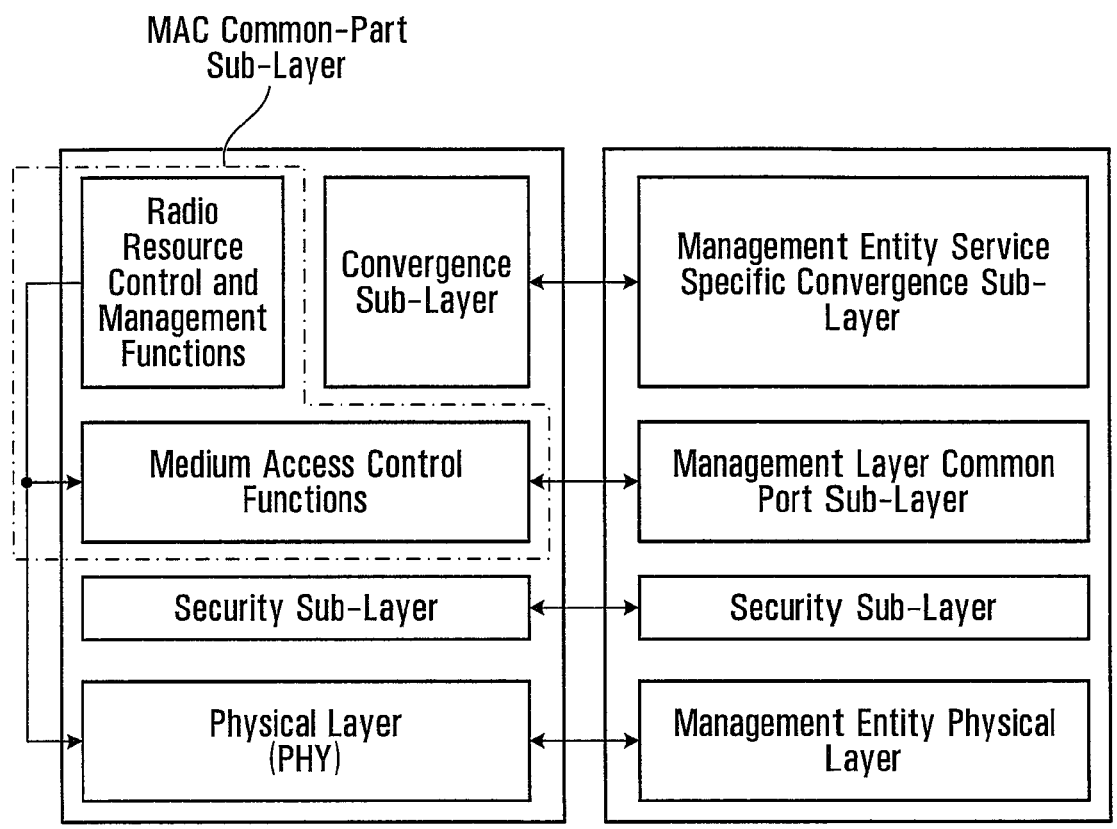
FIG. 9 is FIG. 3 of IEEE 802.16m-08/003rl, a System Reference Model.

With reference now to FIG. 9, there is shown a system reference model, which applies to both the SS 16 and the BS 14 and includes various functional blocks including a Medium Access Control (MAC) common part sublayer, a convergence sublayer, a security sublayer and a physical (PHY) layer.

The convergence sublayer performs mapping of external network data received through the CS SAP into MAC SDUs received by the MAC CPS through the MAC SAP, classification of external network SDUs and associating them to MAC SFID and CID, Payload header suppression/compression (PHS).

The security sublayer performs authentication and secure key exchange and Encryption.

The physical layer performs Physical layer protocol and functions.

The MAC common part sublayer is now described in greater detail. Firstly, it will be appreciated that Medium Access Control (MAC) is connection-oriented. That is to say, for the purposes of mapping to services on the SS 16 and associating varying levels of QoS, data communications are carried out in the context of "connections". In particular, "service flows" may be provisioned when the SS 16 is installed in the system. Shortly after registration of the SS 16, connections are associated with these service flows (one connection per service flow) to provide a reference against which to request bandwidth. Additionally, new connections may be established when a customer's service needs change. A connection defines both the mapping between peer convergence processes that utilize the MAC and a service flow. The service flow defines the QoS parameters for the MAC protocol data units (PDUs) that are exchanged on the connection. Thus, service flows are integral to the bandwidth allocation process. Specifically, the SS 16 requests uplink bandwidth on a per connection basis (implicitly identifying the service flow). Bandwidth can be granted by the BS to a MS as an aggregate of grants in response to per connection requests from the MS.

Figure 10:
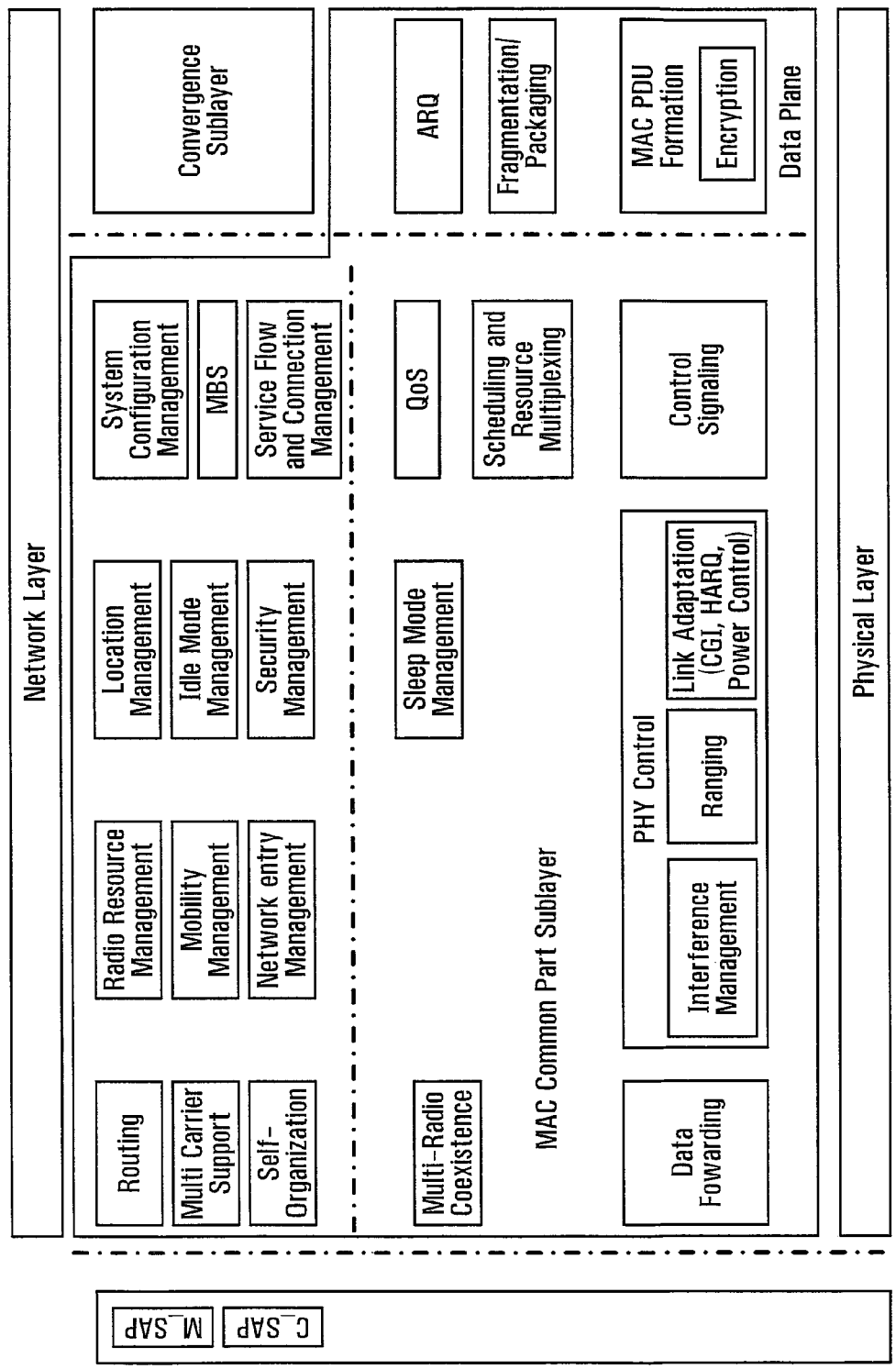
FIG. 10 is FIG. 4 of IEEE 802.16m-08/003rl, The IEEE 802.16m Protocol Structure.

With additional reference to FIG. 10, the MAC common part sublayer (CPS) is classified into radio resource control and management (RRCM) functions and medium access control (MAC) functions.

The RRCM functions include several functional blocks that are related with radio resource functions such as:
  Radio Resource Management
  Mobility Management
  Network Entry Management
  Location Management
  Idle Mode Management
  Security Management
  System Configuration Management
  MBS (Multicast and Broadcasting Service)
  Service Flow and Connection Management
  Relay functions
  Self Organization
  Multi-Carrier
  Radio Resource Management The Radio Resource Management block adjusts radio network parameters based on traffic load, and also includes function of load control (load balancing), admission control and interference control.

Mobility Management

The Mobility Management block supports functions related to Intra-RAT/Inter-RAT handover. The Mobility Management block handles the Intra-RAT/Inter-RAT Network topology acquisition which includes the advertisement and measurement, manages candidate neighbor target BSs/RSs and also decides whether the MS performs Intra-RAT/Inter-RAT handover operation.

Network Entry Management

The Network Entry Management block is in charge of initialization and access procedures. The Network Entry Management block may generate management messages which are needed during access procedures, i.e., ranging, basic capability negotiation, registration, and so on.

Location Management

The Location Management block is in charge of supporting location based service (LBS). The Location Management block may generate messages including the LBS information.

Idle Mode Management

The Idle Mode Management block manages location update operation during idle mode. The Idle Mode Management block controls idle mode operation, and generates the paging advertisement message based on paging message from paging controller in the core network side.

Security Management

The Security Management block is in charge of authentication/authorization and key management for secure communication.

System Configuration Management

The System Configuration Management block manages system configuration parameters, and system parameters and system configuration information for transmission to the MS.

MBS (Multicast and Broadcasting Service)

The MBS (Multicast Broadcast Service) block controls management messages and data associated with broadcasting and/or multicasting service.

Service Flow and Connection Management

The Service Flow and Connection Management block allocates "MS identifiers" (or station identifiers—STIDs) and "flow identifiers" (FIDs) during access/handover/service flow creation procedures. The MS identifiers and FIDs will be discussed further below.

Relay Functions

The Relay Functions block includes functions to support multi-hop relay mechanisms. The functions include procedures to maintain relay paths between BS and an access RS.

Self Organization

The Self Organization block performs functions to support self configuration and self optimization mechanisms. The functions include procedures to request RSs/MSs to report measurements for self configuration and self optimization and receive the measurements from the RSs/MSs.

Multi-Carrier Support

The Multi-carrier (MC) support block enables a common MAC entity to control a PHY spanning over multiple frequency channels. The channels may be of different bandwidths (e.g. 5, 10 and 20 MHz), be on contiguous or non-contiguous frequency bands. The channels may be of the same or different duplexing modes, e.g. FDD, TDD, or a mix of bidirectional and broadcast only carriers. For contiguous frequency channels, the overlapped guard sub-carriers are aligned in frequency domain in order to be used for data transmission.

The medium access control (MAC) includes function blocks which are related to the physical layer and link controls such as:

PHY Control
Control Signaling
Sleep Mode Management
QoS
Scheduling and Resource Multiplexing
ARQ
Fragmentation/Packing
MAC PDU formation
Multi-Radio Coexistence
Data forwarding
Interference Management
Inter-BS coordination PHY Control The PHY Control block handles PHY signaling such as ranging, measurement/feedback (CQI), and HARQ ACK/NACK. Based on CQI and HARQ ACK/NACK, the PHY Control block estimates channel quality as seen by the MS, and performs link adaptation via adjusting modulation and coding scheme (MCS), and/or power level. In the ranging procedure, PHY control block does uplink synchronization with power adjustment, frequency offset and timing offset estimation.

Control Signaling

The Control Signaling block generates resource allocation messages.

Sleep Mode Management

Sleep Mode Management block handles sleep mode operation. The Sleep Mode Management block may also generate MAC signalling related to sleep operation, and may communicate with Scheduling and Resource Multiplexing block in order to operate properly according to sleep period.

QoS

The QoS block handles QoS management based on QoS parameters input from the Service Flow and Connection Management block for each connection.

Scheduling and Resource Multiplexing

The Scheduling and Resource Multiplexing block schedules and multiplexes packets based on properties of connections. In order to reflect properties of connections Scheduling and Resource Multiplexing block receives QoS information from The QoS block for each connection.

ARQ

The ARQ block handles MAC ARQ function. For ARQ-enabled connections, ARQ block logically splits MAC SDU to ARQ blocks, and numbers each logical ARQ block. ARQ block may also generate ARQ management messages such as feedback message (ACK/NACK information).

Fragmentation/Packing

The Fragmentation/Packing block performs fragmenting or packing MSDUs based on scheduling results from Scheduling and Resource Multiplexing block.

MAC PDU Formation

The MAC PDU formation block constructs MAC PDU so that BS/MS can transmit user traffic or management messages into PHY channel. MAC PDU formation block adds MAC header and may add sub-headers.

Multi-Radio Coexistence

The Multi-Radio Coexistence block performs functions to support concurrent operations of IEEE 802.16m and non-IEEE 802.16m radios collocated on the same mobile station.

Data Forwarding

The Data Forwarding block performs forwarding functions when RSs are present on the path between BS and MS. The Data Forwarding block may cooperate with other blocks such as Scheduling and Resource Multiplexing block and MAC PDU formation block.

Interference Management

The Interference Management block performs functions to manage the inter-cell/sector interference. The operations may include:

MAC layer operation

Interference measurement/assessment report sent via MAC signalling

Interference mitigation by scheduling and flexible frequency reuse

PHY layer operation

Transmit power control

Interference randomization

Interference cancellation

Interference measurement

Tx beamforming/precoding

Inter-BS Coordination

The Inter-BS coordination performs functions to coordinate the actions of multiple BSs by exchanging information, e.g., interference management. The functions include procedures to exchange information for e.g., interference management between the BSs by backbone signalling and by MS MAC messaging. The information may include interference characteristics, e.g. interference measurement results, etc.

Figure 11:
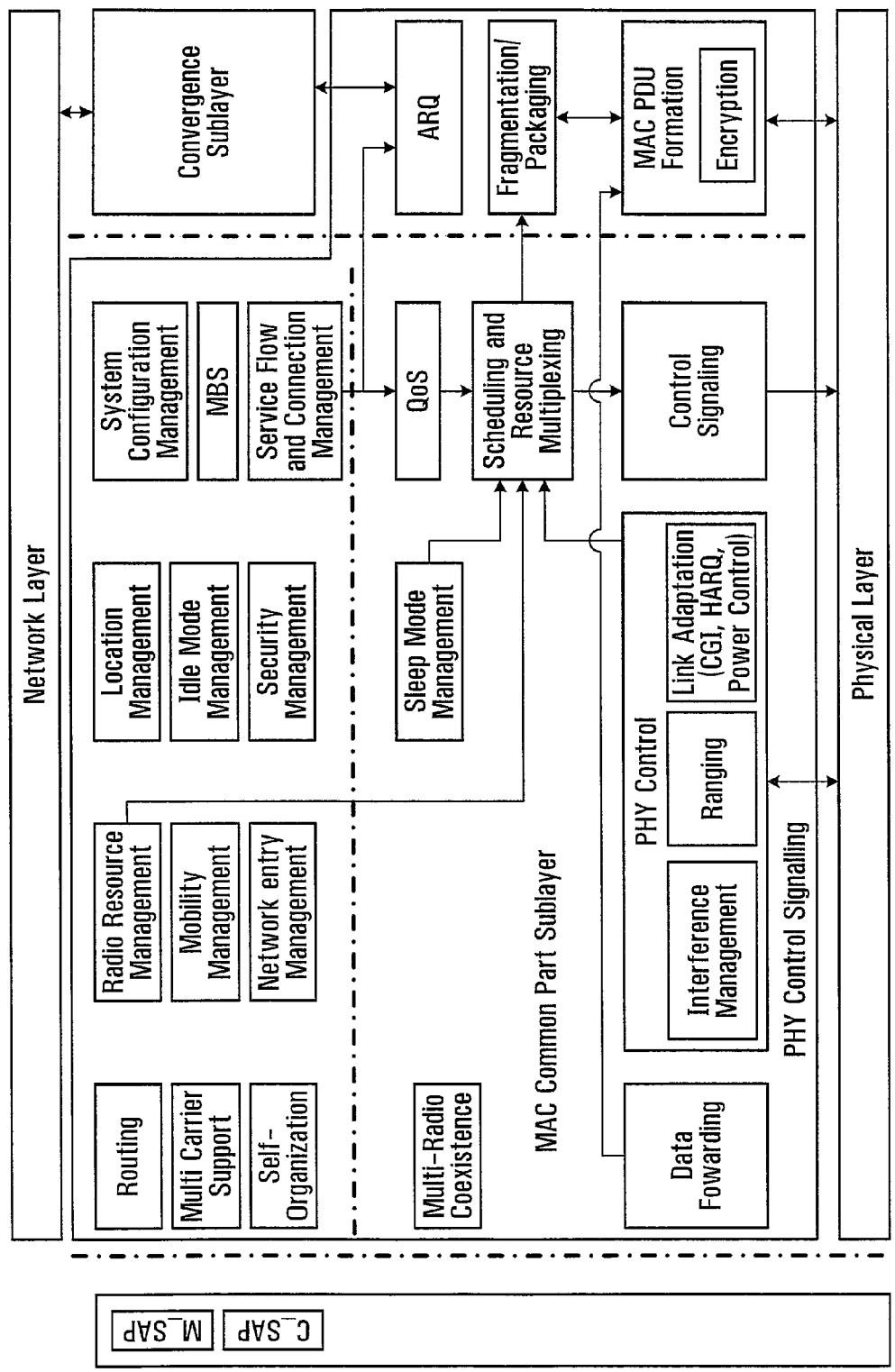
FIG. 11 is FIG. 5 of IEEE 802.16m-08/003rl, The IEEE 802.16m MS/BS Data Plane Processing Flow.

Reference is now made to FIG. 11, which shows the user traffic data flow and processing at the BS 14 and the SS 16. The dashed arrows show the user traffic data flow from the network layer to the physical layer and vice versa. On the transmit side, a network layer packet is processed by the convergence sublayer, the ARQ function (if present), the fragmentation/packing function and the MAC PDU formation function, to form MAC PDU(s) to be sent to the physical layer. On the receive side, a physical layer SDU is processed by MAC PDU formation function, the fragmentation/packing function, the ARQ function (if present) and the convergence sublayer function, to form the network layer packets. The solid arrows show the control primitives among the CPS functions and between the CPS and PHY that are related to the processing of user traffic data.

Figure 12:
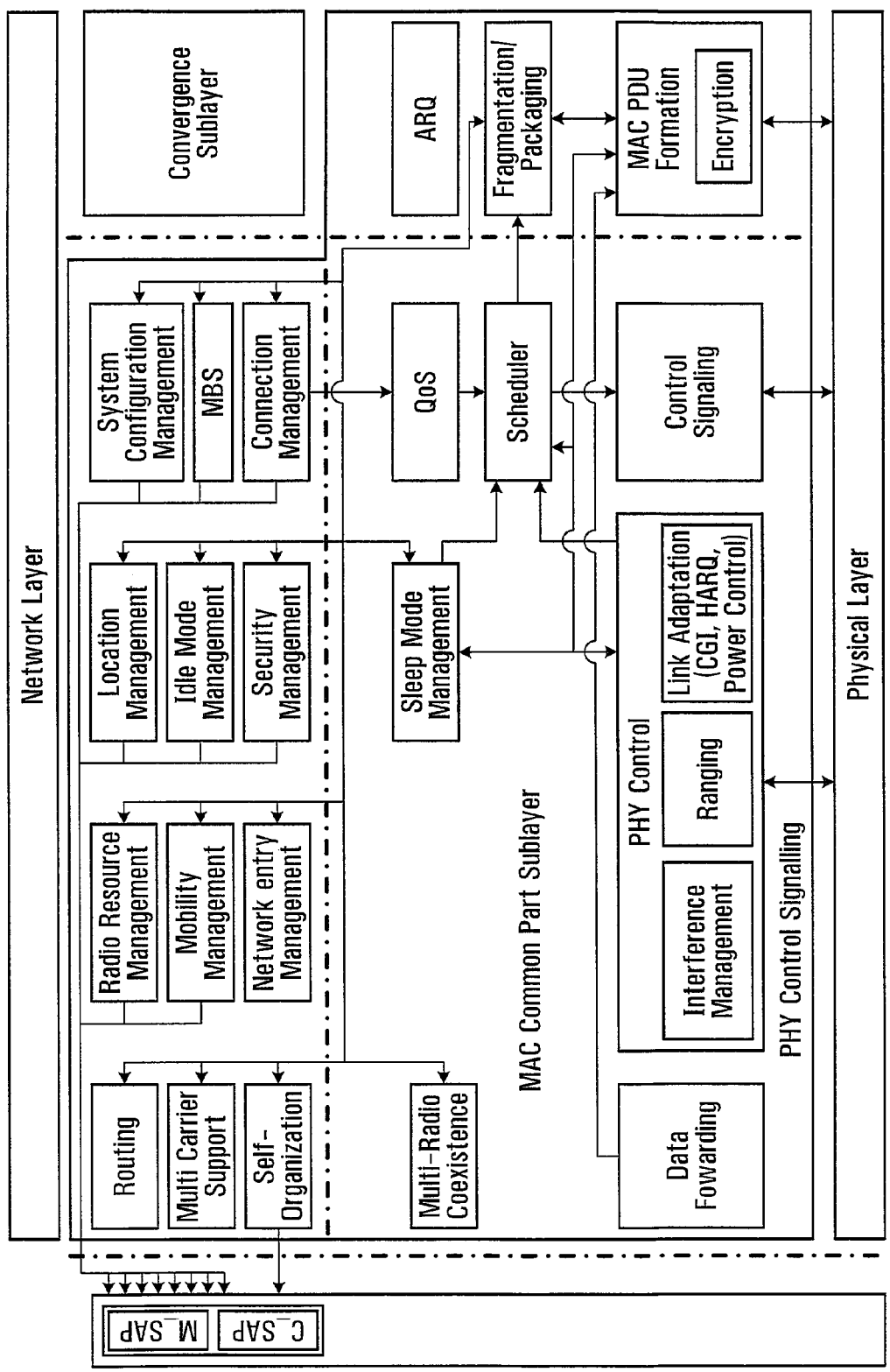
FIG. 12 is FIG. 6 of IEEE 802.16m-08/003rl, The IEEE 802.16m MS/BS Control Plane Processing Flow.

Reference is now made to FIG. 12, which shows the CPS control plane signaling flow and processing at the BS 16 and the MS 14. On the transmit side, the dashed arrows show the flow of control plane signaling from the control plane functions to the data plane functions and the processing of the control plane signaling by the data plane functions to form the corresponding MAC signaling (e.g. MAC management messages, MAC header/sub-header) to be transmitted over the air. On the receive side, the dashed arrows show the processing of the received over-the-air MAC signaling by the data plane functions and the reception of the corresponding control plane signaling by the control plane functions. The solid arrows show the control primitives among the CPS functions and between the CPS and PHY that are related to the processing of control plane signaling. The solid arrows between M_SAP/C_SAP and MAC functional blocks show the control and management primitives to/from Network Control and Management System (NCMS). The primitives to/from M_SAP/C_SAP define the network involved functionalities such as inter-BS interference management, inter/intra RAT mobility management, etc, and management related functionalities such as location management, system configuration etc.

Figure 13:
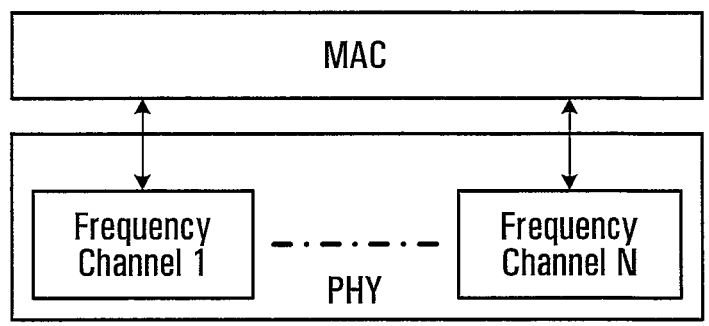
FIG. 13 is FIG. 7 of IEEE 802.16m-08/003rl, Generic protocol architecture to support multicarrier system.

Reference is now made to FIG. 13, which shows a generic protocol architecture to support a multicarrier system. A common MAC entity may control a PHY spanning over multiple frequency channels. Some MAC messages sent on one carrier may also apply to other carriers. The channels may be of different bandwidths (e.g. 5, 10 and 20 MHz), be on contiguous or non-contiguous frequency bands. The channels may be of different duplexing modes, e.g. FDD, TDD, or a mix of bidirectional and broadcast only carriers.

The common MAC entity may support simultaneous presence of MSs 16 with different capabilities, such as operation over one channel at a time only or aggregation across contiguous or non-contiguous channels.

Control signals, like other data, are transmitted over the wireless medium between the BS 14 and an SS 16 using a particular modulation scheme according to which the data is converted into symbols. A symbol is the smallest quantum of information that is transmitted at once. A symbol may represent any number of bits, depending on the modulation scheme used, but commonly represents between 1 and 64 bits, and in some common modulation scheme, each symbol represents 2 bits. Regardless of the modulation scheme used, a single modulated symbol is sent over a single subcarrier and generally represents the smallest quantum of information that can be sent over the air interface.

In a non-limiting example of implementation of the invention, the wireless system uses different types of MAC PDUs. At least two different types are considered. The first type uses MAC PDUs with encapsulated payload. The second type carries no encapsulated payload and it is used for transporting control information. In a possible variant, the MAC PDU with encapsulated payload may be provided with a sub-header to carry, in addition to the payload, control information. The same approach can also be applied to a MAC PDU without payload. A sub-header can be used as well to carry additional control information. The different types of MAC PDUs will be described below in conjunction with FIGS. 14 to 23.

Figure 14:
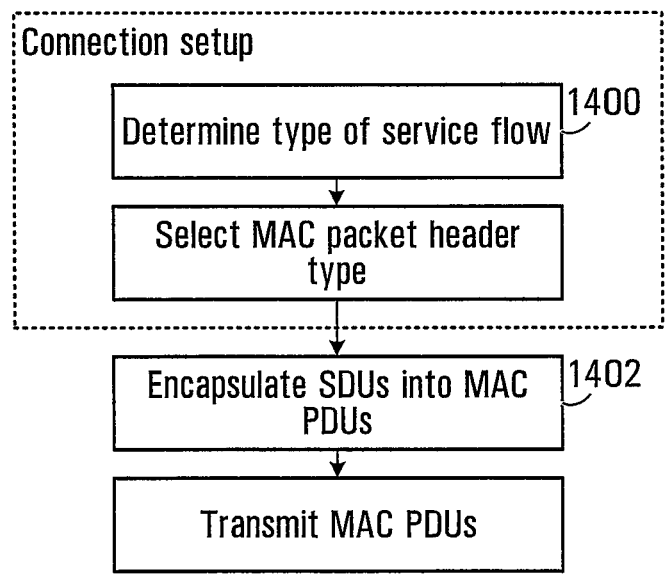
FIG. 14 is a block diagram of a process for performing selection of the type of header MAC PDU to be used in a wireless system.

FIG. 14 is a flowchart of a process that performs selection of a type of MAC packet with payload, specifically the type of the MAC packet header to be used. The process is performed by software implemented logic, where the software is executed by a CPU.

In this specific example of implementation, two different header types are considered and the particular header to be used is determined on the basis of the data traffic type. The first header type is a shorter version which reduces the total overhead and thus facilitates processing and reduced bandwidth requirements. The second type is a longer version.

With continued reference to FIG. 14, the service flow is assessed at step 1400. This step typically would be performed during connection setup and may require negotiation between the transmitter and the receiver. Once the type of service flow has been determined the MAC packet header type is selected. The selection process may be done on the basis of predetermined selection criteria which are related to the service flow. For example service flows that:

1. do not require encryption;
2. do not require ARQ;
3. do not require fragmentation;
4. use SDUs of limited types of lengths.

are suitable for encapsulation in a MAC PDU with a shorter header type. Note that selection process is implemented by selection logic that can be executed at suitable location in the wireless system. In a specific example of implementation, the selection logic may be integrated within the MAC PDU formation functional block illustrated at FIGS. 10, 11 and 12. The selection logic can apply a single criterion or two or more criteria in conjunction in order to determine the type of MAC PDU header to use. The weight of each individual criterion can vary in the selection process as one criterion can be more important than others. For example, if the service flow is such that it does not require encryption, the shorter header type is selected irrespective of the other criteria. In a different example, the shorter header type will be selected only if the service flow does not require ARQ and does not require fragmentation. The absence of ARQ requirement does not in itself suffice to select the shorter header type.

One specific example of a service flow that is suitable for use with the shorter header version of the MAC PDU is VoIP service.

A specific example of implementation of the short version of the header is illustrated in FIG. 15. The header has an 8 bit length, although this may change depending on the specific implementation of the invention. The header format has a header type field (HT) 1500 which is a one bit field intended to indicate the particular type of header that is being used. Two types of headers are being considered. The first type relates to MAC PDUs which carry a payload with or without a sub header. The second type relates to MAC PDUs without payload that carry control information. For instance, when the HT bit is set to 1, this indicates that the MAC PDU has a payload or a sub header. "0" indicates that no payload is carried which corresponds to MAC PDUs that carry control information, as it will be discussed later. The FID field 1502 is a 4 bit field that conveys the flow identifier.

The last field 1504 is a 3 bit field that contains information which can vary depending on the particular scheme used with SDU packing/concatenation. One possible SDU packing/concatenation scheme is to perform the concatenation outside of the MAC PDU. In other words, each MAC PDU contains a single SDU. In this fashion, multiple MAC PDUs are concatenated to form a PHY SDU. Another possible scheme is to perform the concatenation within the MAC PDU, such that each MAC PDU contains multiple SDUs of fixed length.

When the first scheme is used, namely SDU concatenation outside the MAC PDU, the three bit field 1504 is used to indicate the length type of the SDU. Since the MAC PDU contains a single SDU, the length type information indicates the length of the SDU in the MAC PDU flow. Different SDU lengths are possible, each corresponding to a different value of the 3 bit indicator. Referring back to FIG. 14, the connection setup operation includes exchange of control data that allows the receiver and the transmitter to "agree" on the meaning of the SDU length codes such that the SDU length information in the header can be adequately decoded at the receiving end. This is done by exchanging control information between the receiving end and the transmitting end. Once a negotiated definition of the code (and the corresponding SDU length) has been completed data transmission can occur.

Note that the 3 bit indicator only allows a limited number of SDU lengths to be specified. For more flexibility in terms of possible SDU lengths it is possible to use a longer version of the header that is discussed later.

When the second scheme is used, where the MAC PDU contains multiple SDUs of fixed length, the field 1504 indicates the number of SDUs concatenated in the MAC PDU.

The wireless system can be set to operate under anyone of the schemes discussed above. The setting can be permanent, in the sense that the system can be designed to work under one of the schemes only or it may be possible to change the operation by selecting from one scheme to the other.

The step 1402 at FIG. 14 designates the operation where MAC PDUs are formed. This operation would be conducted in accordance with the settings established earlier, namely use or not of a short header and the type of SDU concatenation scheme.

When the service flow is such that a short header is not suitable, a longer header can be used. Examples of service flows where a longer header is advantageous are service flows where encryption is required, fragmentation and packing are possible or a larger range of length values for the SDUs are needed. The selection of the longer MAC PDU header is performed by method illustrated at FIG. 14, as discussed earlier by the selection logic that determines the service flow and its characteristics and selects the type of header that is the most appropriate.

The structure of the long header, while requiring more bits than the short version of the header discussed earlier, is nonetheless designed to reduce total overhead by aggregating per SDU information, thus obviating the need for a packing sub header per SDU fragment. In addition or alternatively, the SDU fragment sequence number is associated with service flow instead of per SDU which also reduces overhead. Yet, another possible approach that can be used is to concatenate multiple SDUs within a MAC PDU in order to further reduce security encryption overhead.

The structure of the long header of the MAC PDU that carries a payload will be described in greater detail with reference to FIGS. 16 to 20. Generally, it is known to use in MAC PDU packets that encapsulate multiple SDUs, especially variable length SDUs, fields that provide SDU specific information, such as the length of each SDU or SDU fragment. This approach increases the packet overhead. In contrast, the MAC PDU illustrated in FIG. 17 is designed to reduce the packet overhead by implementing several strategies. Those strategies can be used individually or in combination, depending on the specific application.

Figure 18:
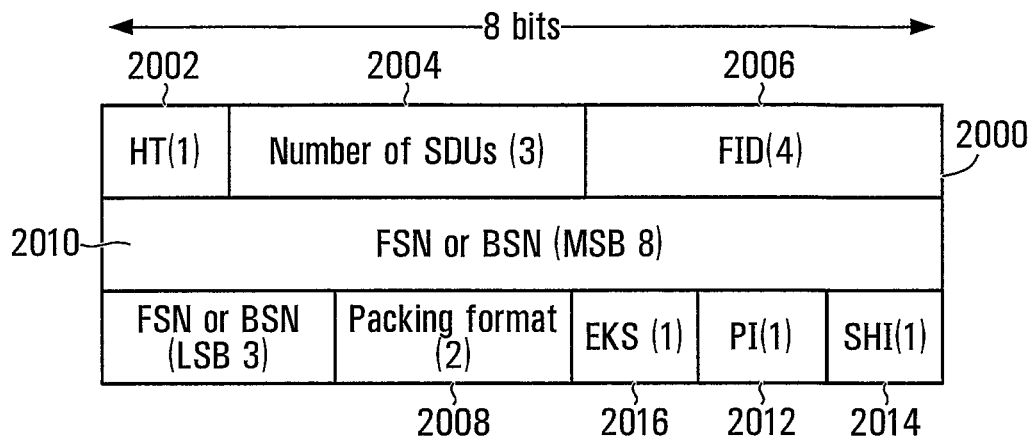
FIG. 18 illustrates the structure of a header of a MAC PDU according to a first example of implantation of the invention.
Figure 19:
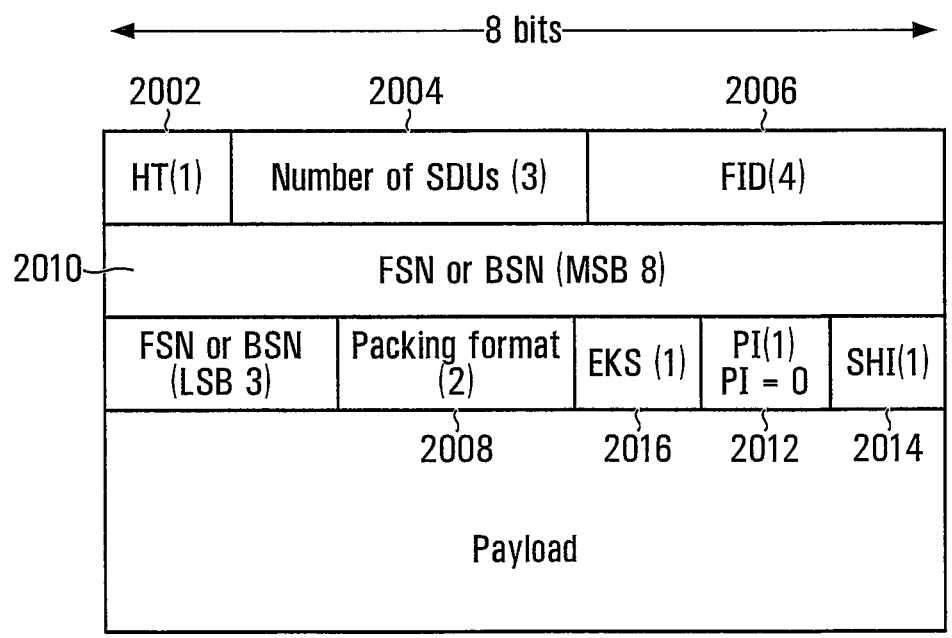
FIG. 19 illustrates the structure of a header of a MAC PDU according to a second example of implementation of the invention.

FIG. 18 illustrates the header structure of the MAC PDU with payload according to an example of implementation of the invention. The header 2000 has a Header Type (HT) field 2002, which is of 1 bit and intended to indicate the type of header. The HT field is followed by number of SDUs field 2004, which has a 3 bit size and which indicates the number of SDUs encapsulated in the MAC PDU. One option is to use this field also to indicate that the MAC PDU contains only one or more control sub headers and no payload. For example when the 3 bit number of SDUs field 2004 is set to 000, this value indicates that no payload is present and only a control sub header is carried by the MAC PDU. Another possibility is to reserve the number of SDUs field 2004 only for a number of SDUs in the MAC PDU packet. Under this option, the MAC PDU cannot be configured to convey sub headers only, without payload.

The Flow Indicator (FID) field 2006 is a four bit field that indicates the service flow associated with the MAC PDU. The packing format field 2008 is a two bit field that indicates if the SDU payload is fragmented (carries one or more SDU fragments) and where the fragment is located in the payload. This is better illustrated at FIG. 16 which is a scenario where multiple SDUs are encapsulated in the MAC PDU. The two bit field allows for four different combinations that correspond to four possible SDU fragmentation schemes.

The first fragmentation scheme is shown at 1800, where the SDU payload has at the beginning an SDU fragment 1802, which is followed by one or more complete SDUs 1804 and which terminates with yet another SDU fragment 1806. In this example, the packing format field 2008 is set to "11". Another SDU fragmentation scheme is shown at 1808. In this case the SDU payload starts with an SDU fragment 1810 and is followed by one or more complete SDUs 1812. This scheme is designated by "10" in the packing format field 2008. Another fragmentation scheme shown at 1814 is essentially the reverse of the previous fragmentation scheme, where the SDU payload starts with a complete SDU 1816, followed by one or more complete SDUs 1818 and terminating with an SDU fragment 1820. This scheme is designated by "01" in the packing format field 2008. The last fragmentation scheme 1822 carries only complete SDUs 1824. This fragmentation scheme is identified by "00" in the packing format field 2008.

The scenario illustrated at FIG. 17 corresponds to a MAC PDU which carries at most a single complete SDU or a fragment of a single SDU. In this case there are also four possible fragmentation schemes. The first scheme, shown at 1900 is a situation where the SDU fragment is a middle fragment, in other words two other SDU fragments exist, namely the beginning of the SDU and the end of the SDU. Those other fragments are carried by other MAC PDUs. This fragmentation scheme is identified by "11" in the packing format field 2008.

The fragmentation scheme 1902 corresponds to a situation where the MAC PDU carries only the fragment which forms the beginning of the SDU. This case is identified by "10" in the packing format field 2008. Another fragmentation scheme 1904 is the fragment that is the end of the SDU. This scheme is identified by "01". 1906 is the final fragmentation scheme, where a single, non fragmented SDU is encapsulated in the MAC PDU. This scenario is identified by "00" in the packing format field 2008.

The Fragment Sequence Number (FSN) or the ARQ Block Sequence Number (BSN) field 2010 is an 11 bit field that identifies the fragment sequence number or the ARQ block sequence number of the first fragment of an SDU or the first ARQ block. The FSN/BSN field 2010 is an 11 bit field that is too large to fit in the second byte of the header and for that reason it is split in two, the first sub-field containing the 8 most significant bits resides in the second byte, while the second consecutive sub-field containing the three least significant bits resides in the third byte of the header.

Figure 20:
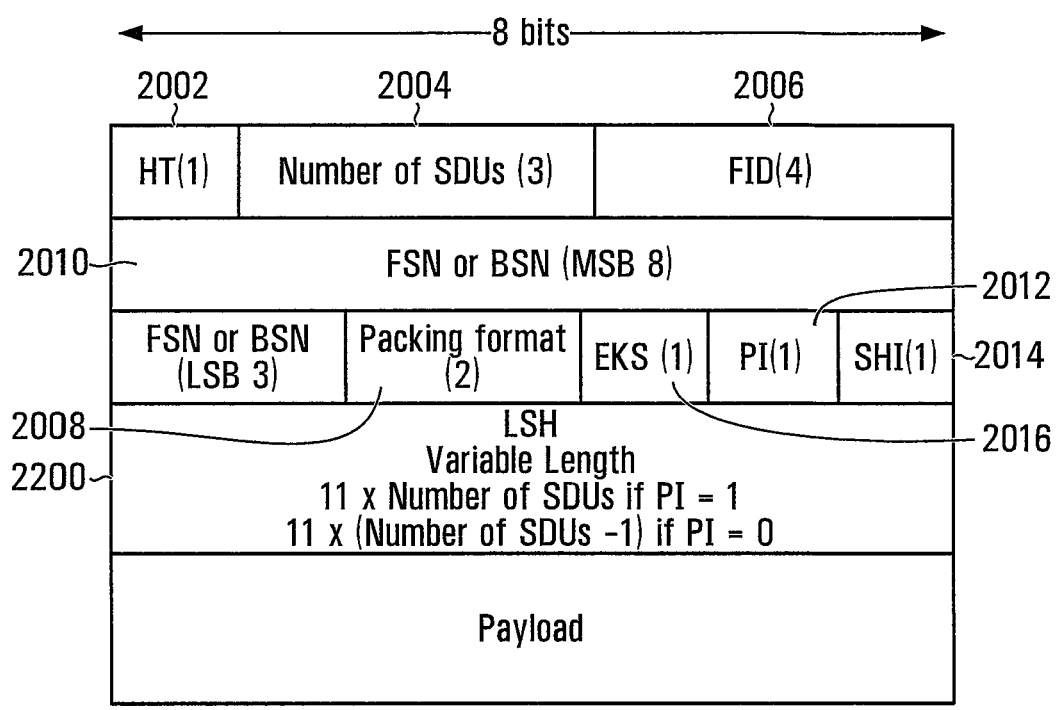
FIG. 20 illustrates the structure of a MAC PDU which uses a Length Sub-Header field, according to yet another example of implementation of the invention.

The header further includes a Packing Indicator (PI) 2012 that is a one bit field to indicate whether there are padding bits. If PI is set to "1", this is used to indicate that padding is present and that also a Length Sub-Header (LSH) 2200 is present after the 3 byte MAC header. This case is illustrated in FIG. 20. One possibility when PI is set to "1" is to load the LSH 2200 with (Number of SDUs×11 bits) to show length related information.

On the other hand, if there is no padding, the PI field 2012 is set to "0". In this case, if the number of SDUs indicated in the field 2004 has been set to "1" then an LSH will not be present in the MAC PDU. This case is specifically shown at FIG. 19.

However, if the number of SDUs in the field 2004 is greater than 1, then an LSH will be provided after the 3 byte MAC PDU header in order to indicate the length of the first (number of SDUs−1) SDUs.

Another option, not shown in the drawings, is to partition the LSH into sub-fields where each sub-field is associated with a respective SDU. Each length sub-field includes a one bit length type indicator and the length (7 or 11 bits) of the corresponding SDU. Thus the LSH is of a variable length (depending on the number of SDUs) and it is made up of a number of sub-fields corresponding to the number of SDUs.

The LSH 2200 is octet aligned.

Note that for certain applications the information in the FID field 2006 can be moved in the LSH.

Referring back to FIG. 20, the header further includes a Sub-Header Indicator field 2014. This is a one bit field to indicate whether other sub-headers, such as control sub-headers are present.

The Encryption Key Sequence field is a one bit field that holds a security key sequence number. In this example, two keys are assumed.

Figure 21:
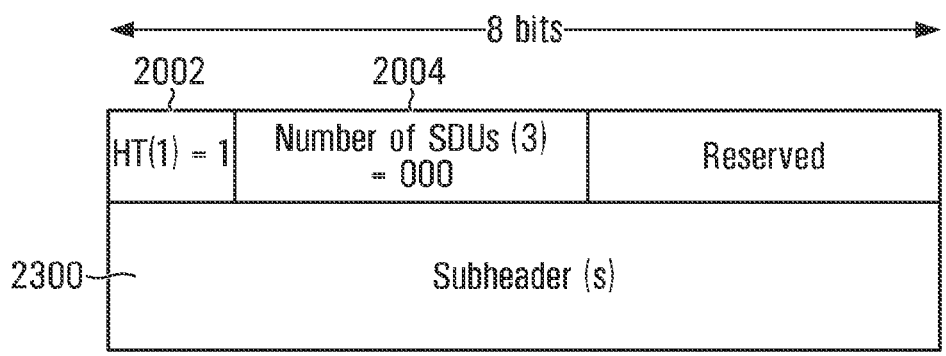
FIG. 21 illustrates the structure of a header and sub-header combination of a MAC PDU, according to yet another example of implementation of the invention.
Figure 22:
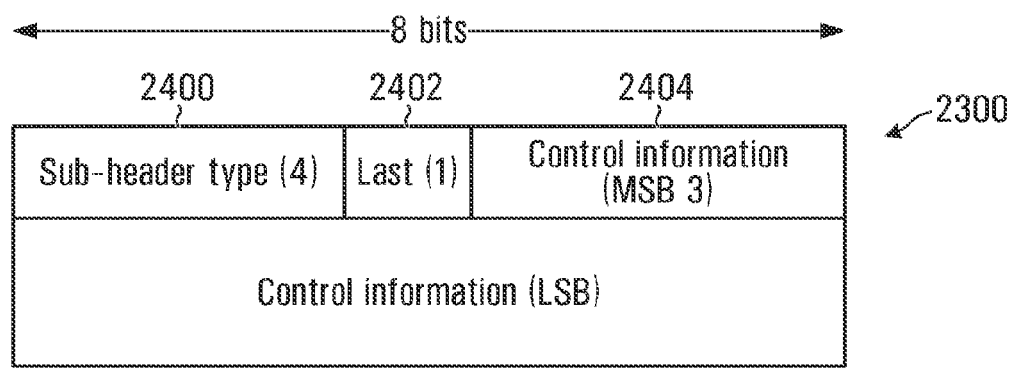
FIG. 22 illustrates in greater detail the structure of the sub-header of the MAC PDU of FIG. 21.

FIG. 21 illustrates yet another variant of the MAC PDU, which is structured as a header and sub-header combination without any payload capability. This approach can be used to carry control information in the sub-header. An example of control information that can be carried in the context of wireless communication is ARQ feedback information.

In the case of a header/sub-header combination only, the number of SDUs field 2004 is set to "000" which indicates that only a sub-header is present and there is no payload. The HT field 2002 is set to "1" and the last 4 bits in the byte are reserved. The structure of the sub-header 2300 is shown in greater detail at FIG. 22. The sub-header 2300 includes a 4 bit Sub-Header Type (SHT) field 2400 that indicates the type of control information that is carried by the sub-header 2300. A one bit Last field 2402 is provided which indicates if this is the last sub-header in the stream of sub-headers conveying the control information. A "1" in the Last field 2402 means that the sub-header 2300 is the last sub-header. Thus, the receiver processing the control information will be made aware that no further control information is to be expected.

The 3 bits in the residual slot 2404 of the first byte of the sub-header 2300 are used to store the most significant bits of the control information. The least significant bits follow in one or more bytes, depending on the amount of control information to be carried.

The sub-header 2300 is designed such that it is of a fixed and thus known length depending on the type of control information that is being conveyed. The length may vary from one type of control information to another but for a given control information type specified in the sub-header type field 2400 the total length of the sub-header 2300 is fixed and does not change.

Note that the sub-header 2300 that carries control information would typically follow the header of the MAC PDU, but if the MAC packet contains an LSH, the sub-header 2300 will be placed after the LSH.

Figure 23:
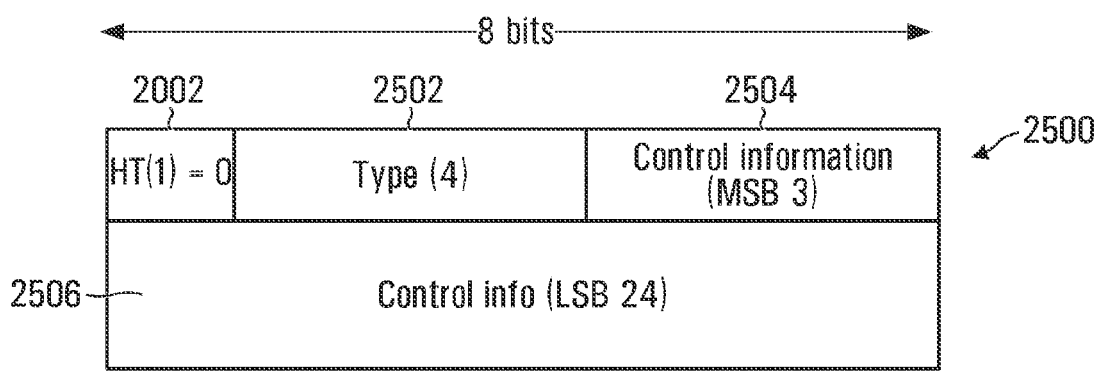
FIG. 23 illustrates the structure of the header of a MAC packet, according to yet another example of implementation of the invention that is used to carry control information.

FIG. 23 illustrates yet another possibility in which control information is placed directly in the header of the MAC packet. In this case, the header 2500 has a HT field 2002 which is set to "0". The HT field is followed by a four bit type field 2502 to indicate the type of control information that is being sent. The residual three bit space 2504 in the first byte of the header is used to hold the three most significant bits of the control information. The control header 2500 is of a fixed length. In this example of implementation, it is of four bytes, the last three bytes 2506 being used to hold the 24 least significant bits of the control information.

The MAC packet with a control header can be used in a number of possible scenarios. For example such a packet or a series of packets can be sent on the uplink stand alone or with other MAC PDUs following a ranging code transmission. The entity that receives the MAC PDUs with the control information processes the MAC PDUs to extract the control information and performs in response to the control information an appropriate action.

The fixed length design of the MAC PDU with the control header allows the base station to assign a fixed uplink resource following ranging from a mobile station. Similarly, the MAC packet with the control header 2500 can be sent on the downlink with other MAC PDUs or stand alone.

The above-described embodiments of the present application are intended to be examples only. Those of skill in the art may effect alterations, modifications and variations to the particular embodiments without departing from the scope of the application.

The invention claimed is:

1. A method for implementing wireless communication using Medium Access Control Protocol Data Units (MAC PDUs), the method comprising:
    identifying at least one characteristic of a service flow;
    selecting, from a plurality of MAC PDU headers, and based on the identified at least one characteristic, a MAC PDU header that corresponds to a Service Data Unit (SDU) fragmentation scheme, wherein the selected MAC PDU header includes a field whose value indicates a location of one or more SDU fragments that are included within a payload of a MAC PDU to which the selected MAC PDU header will be assigned;
    encapsulating service flow data as SDU fragments into payloads of one or more MAC PDUs, wherein each of the one or more MAC PDUs includes the selected MAC PDU header, and the field of the selected MAC PDU header is assigned a value based on how the SDU fragments are placed within the payload; and
    wirelessly transmitting the encapsulated service flow data using the one or more MAC PDUs.

2. The method as defined in claim 1, wherein the at least one characteristic of the service flow includes an encryption requirement.

3. The method as defined in claim 1, wherein the at least one characteristic of the service flow includes an Automatic Repeat Request (ARQ) requirement.

4. The method as defined in claim 1, wherein the at least one characteristic of the service flow includes an SDU fragmentation requirement.

5. The method as defined in claim 1, wherein the at least one characteristic of the service flow includes a range of possible lengths of the SDU fragments.

6. The method as defined in claim 1, wherein the plurality of MAC PDU headers include a first header and a second header, and the second header represents the MAC PDU header.

7. The method as defined in claim 6, wherein the first header is shorter than the second header.

8. The method as defined in claim 6, wherein, when a MAC PDU includes the first header, the MAC PDU includes only a single SDU fragment.

9. The method as defined in claim 8, wherein the first header of the MAC PDU includes a field whose value indicates a length of the single SDU fragment.

10. The method as defined in claim 6, wherein the first header includes a field whose value indicates whether the MAC PDU has a payload.

11. The method as defined in claim 6, wherein encapsulating the service flow data comprises fragmenting at least a portion of the service flow data into at least two SDU fragments that are placed into a payload of at least one MAC PDU.

12. The method as defined in claim 11, wherein the at least one MAC PDU does not include a sub-header in connection with each SDU fragment.

13. The method as defined in claim 11, wherein the at least one MAC PDU has a sub-header that indicates a length of at least one of the SDU fragments.

14. The method as defined in claim 13, wherein the sub-header immediately follows the selected MAC PDU header.

15. The method as defined in claim 11, wherein the selected MAC PDU header includes a field whose value indicates a number of SDUs in the payload of the MAC PDU.

16. A non-transitory computer readable storage medium configured to store instructions that, when executed by a processor included in a computing device, cause the computing device to implement a method for wireless communication using Medium Access Control Protocol Data Units (MAC PDUs), the method comprising:
    identifying at least one characteristic of a service flow;
    selecting, from a plurality of MAC PDU headers, and based on the identified at least one characteristic, a MAC PDU header that corresponds to a Service Data Unit (SDU) fragmentation scheme, wherein the selected MAC PDU header includes a field whose value indicates a location of one or more SDU fragments that are included within a payload of a MAC PDU to which the selected MAC PDU header will be assigned;
    encapsulating service flow data as SDU fragments into payloads of one or more MAC PDUs, wherein each of the one or more MAC PDUs includes the selected MAC PDU header, and the field of the selected MAC PDU header is assigned a value based on how the SDU fragments are placed within the payload; and
    wirelessly transmitting the encapsulated service flow data using the one or more MAC PDUs.

17. The non-transitory computer readable storage medium as defined in claim 16, wherein the at least one characteristic of the service flow includes an encryption requirement.

18. The non-transitory computer readable storage medium as defined in claim 16, wherein the at least one characteristic of the service flow includes an Automatic Repeat Request (ARQ) requirement.

19. The non-transitory computer readable storage medium as defined in claim 16, wherein the at least one characteristic of the service flow includes an SDU fragmentation requirement.

20. The non-transitory computer readable storage medium as defined in claim 16, wherein the at least one characteristic of the service flow includes a range of possible lengths of the SDU fragments.

21. The non-transitory computer readable storage medium as defined in claim 16, wherein the plurality of MAC PDU headers include a first header and a second header, and the second header represents the MAC PDU header.

22. The non-transitory computer readable storage medium as defined in claim 21, wherein the first header is shorter than the second header.

23. The non-transitory computer readable storage medium as defined in claim 21, wherein, when a MAC PDU includes the first header, the MAC PDU includes only a single SDU fragment.

24. The non-transitory computer readable storage medium as defined in claim 23, wherein the first header of the MAC PDU includes a field whose value indicates a length of the single SDU fragment.

25. The non-transitory computer readable storage medium as defined in claim 21, wherein the first header includes a field whose value indicates whether the MAC PDU has a payload.

26. The non-transitory computer readable storage medium as defined in claim 21, wherein encapsulating the service flow data comprises fragmenting at least a portion of the service flow data into at least two SDU fragments that are placed into a payload of at least one MAC PDU.

27. The non-transitory computer readable storage medium as defined in claim 26, wherein the at least one MAC PDU does not include a sub-header in connection with each SDU fragment.

28. The non-transitory computer readable storage medium as defined in claim 26, wherein the at least one MAC PDU has a sub-header that indicates a length of at least one of the SDU fragments.

29. The non-transitory computer readable storage medium as defined in claim 28, wherein the sub-header immediately follows the selected MAC PDU header.

30. The non-transitory computer readable storage medium as defined in claim 26, wherein the selected MAC PDU header includes a field whose value indicates a number of SDUs in the payload of the MAC PDU.

31. A device for implementing performing wireless communication using Medium Access Control Protocol Data Units (MAC PDUs), comprising:
   a processor; and
   a memory, wherein the memory is configured to store instructions that, when executed by the processor, cause the device to:
      identify at least one characteristic of a service flow;
      select, from a plurality of MAC PDU headers, and based on the identified at least one characteristic, a MAC PDU header that corresponds to a Service Data Unit (SDU) fragmentation scheme, wherein the selected MAC PDU header includes a field whose value indicates a location of one or more SDU fragments that are included within a payload of a MAC PDU to which the selected MAC PDU header will be assigned;
      encapsulate service flow data as SDU fragments into payloads of one or more MAC PDUs, wherein each of the one or more MAC PDUs includes the selected MAC PDU header, and the field of the selected MAC PDU header is assigned a value based on how the SDU fragments are placed within the payload; and
      wirelessly transmit the encapsulated service flow data using the one or more MAC PDUs.

32. The device as defined in claim 31, wherein the at least one characteristic of the service flow includes an encryption requirement.

33. The device as defined in claim 31, wherein the at least one characteristic of the service flow includes an Automatic Repeat Request (ARQ) requirement.

34. The device as defined in claim 31, wherein the at least one characteristic of the service flow includes an SDU fragmentation requirement.

35. The device as defined in claim 31, wherein the at least one characteristic of the service flow includes a range of possible lengths of the SDU fragments.

36. The device as defined in claim 31, wherein the plurality of MAC PDU headers include a first header and a second header, and the second header represents the MAC PDU header.

37. The device as defined in claim 36, wherein the first header is shorter than the second header.

38. The device as defined in claim 36, wherein, when a MAC PDU includes the first header, the MAC PDU includes only a single SDU fragment.

39. The device as defined in claim 38, wherein the first header of the MAC PDU includes a field whose value indicates a length of the single SDU fragment.

40. The device as defined in claim 36, wherein the first header includes a field whose value indicates whether the MAC PDU has a payload.

41. The device as defined in claim 36, wherein encapsulating the service flow data comprises fragmenting at least a portion of the service flow data into at least two SDU fragments that are placed into a payload of at least one MAC PDU.

42. The device as defined in claim 41, wherein the at least one MAC PDU does not include a sub-header in connection with each SDU fragment.

43. The device as defined in claim 41, wherein the at least one MAC PDU has a sub-header that indicates a length of at least one of the SDU fragments.

44. The device as defined in claim 43, wherein the sub-header immediately follows the selected MAC PDU header.

45. The device as defined in claim 41, wherein the selected MAC PDU header includes a field whose value indicates a number of SDUs in the payload of the MAC PDU.

* * * * *